United States Patent
Vlasov et al.

[15] 3,699,572
[45] Oct. 17, 1972

[54] APPARATUS FOR AUTOMATICALLY CONTROLLING THE MOVEMENT OF A DREDGER ALONG A PREDETERMINED PATH FOR PERFORMING A DREDGING OPERATION AT A NAVIGABLE AREA OF A WATERWAY

[72] Inventors: Viktor Griogroievich Vlasov; Jury Sergeevich Berezentsev; Vladimir Ivanovich Mukhin; Zhorzh Yakovlevich Kravchenko, all of Novosibirsk, U.S.S.R.

[73] Assignee: Novosibirsky Institut Inzhenerov Vodnogo Transporta, Novosibirsk, U.S.S.R.

[22] Filed: Nov. 10, 1969

[21] Appl. No.: 875,122

[52] U.S. Cl. .............................................343/7 ED
[51] Int. Cl. ..................................................G01s 9/04
[58] Field of Search ........................................343/7 ED

[56] References Cited

UNITED STATES PATENTS 3,181,146   4/1965   Huckabay ...............343/7 ED

*Primary Examiner*—Benjamin A. Borchelt
*Assistant Examiner*—R. Kinberg
*Attorney*—Waters, Roditi, Schwartz & Nissen

[57] ABSTRACT

An apparatus for controlling automatically the movement of a dredger along a predetermined path for performing a dredging operation at a navigable area of a waterway, comprising receiving-transmitting radio stations, a unit adapted to measure the difference between the distances from the dredger to a pair of receiving-transmitting radio stations located exteriorly of the dredger, a second unit adapted to measure the sum of these distances and a correction unit. The apparatus features a high reliability and ensures high accuracy of controlling the progress of the dredger along the predetermined path, as well as a high accuracy of re-positioning the dredger at a spot where it had been operating prior to having been removed therefrom for letting other ships pass.

4 Claims, 5 Drawing Figures

APPARATUS FOR AUTOMATICALLY CONTROLLING THE MOVEMENT OF A DREDGER ALONG A PREDETERMINED PATH FOR PERFORMING A DREDGING OPERATION AT A NAVIGABLE AREA OF A WATERWAY

The present invention relates to systems for automation of production processes, and, more particularly, it relates to apparatus for automatically controlling the movement of a dredger along a predetermined path for performing a dredging operation at a navigable area of a waterway.

Known in the art is apparatus for controlling automatically the movement of a dredger.

In this known apparatus the position of a dredger is determined by measuring the respective distances from the dredger to a pair of radio receiving and transmitting stations located outside the dredger. The output unit of the known apparatus is an automatic course-laying device comprising a planetable upon which, in an appropriate scale, are illustrated the area of the shipping channel to be dredged, a movable model of the dredger and the points of location of the exterior receiving-transmitting stations. The movable model of the dredger is connected with these points by pivoted arms, the lengths of which are proportional to the respective distances between the points and the dredger.

As the dredger is moving in operation, the lengths therefrom to the receiving-transmitting stations are varying, and the lengths of the respective arms vary accordingly, which makes the model of the dredger move along the plane-table.

When the model of the dredger moves over the plane-table, it engages electric contacts appropriately arranged on the table, whereby corresponding control signals are sent to the drives of the side towing, or hauling winches of the dredger.

Among the disadvantages of this known apparatus are its inadequate operational accuracy, its complicated structure and comparatively low reliability of its performance.

It is an object of the present invention to provide an apparatus for automatically controlling the movement of a dredger along a predetermined path for performing a dredging operation at a navigable area of a waterway, which is free of the abovementioned disadvantages.

With these and other objects in view, the present invention resides in an apparatus for automatically controlling the movement of a dredger along a predetermined path for performing a dredging operation at a navigable area of a waterway, comprising a pair of radio receiving-transmitting stations located outside said dredger and a transmitting and receiving station mounted on board said dredger, said stations being used for determining the position of said dredger, and an electric circuit controlling the operation of the drives of the respective side hauling winches of said dredger for positioning said dredger in accordance with signals developed by said stations, which apparatus, according to the present invention, includes a unit adapted to measure the difference between the distances from said dredger to said pair of receiving and transmitting stations located on the opposite lateral sides of the area of the navigable channel being dredged, the line connecting said pair of receiving and transmitting stations being substantially perpendicular to the longitudinal axis of said area, said unit being connected to the output of said transmitting and receiving station mounted on board said dredger and being adapted to control the operation of said respective drives of said side hauling winches of said dredger.

In order to enable the dredger to be precisely repositioned at a point where it had been operating prior to having been removed from the shipping channel to let other ships pass, it is expedient for the apparatus, embodying the present invention, to include additionally a unit adapted to measure the sum of the distances from the dredger to said pair of radio receiving and transmitting stations located outside said dredger.

In order to increase the accuracy of the movement of the dredger along the predetermined path, it is expedient for the apparatus embodying the present invention to include additionally a correction unit connected with the input of the unit adapted to measure the difference between the distances from the dredger to the pair of receiving and transmitting stations and with the output of the unit adapted to measure the sum of these distances.

It is expedient for this correction unit to be made in the form of a variable speed gear, a synchrotransmitter and a differential selsyn, serially operatively connected with each other. It is also expedient to use a three-position switch for energizing and deenergizing the correction unit block, as well as for reversing the sign of correction.

Other objects and advantages of the present invention will become apparent from the following detailed description of an embodiment thereof, with due reference being had to the accompanying drawings, wherein.

Figure 1:
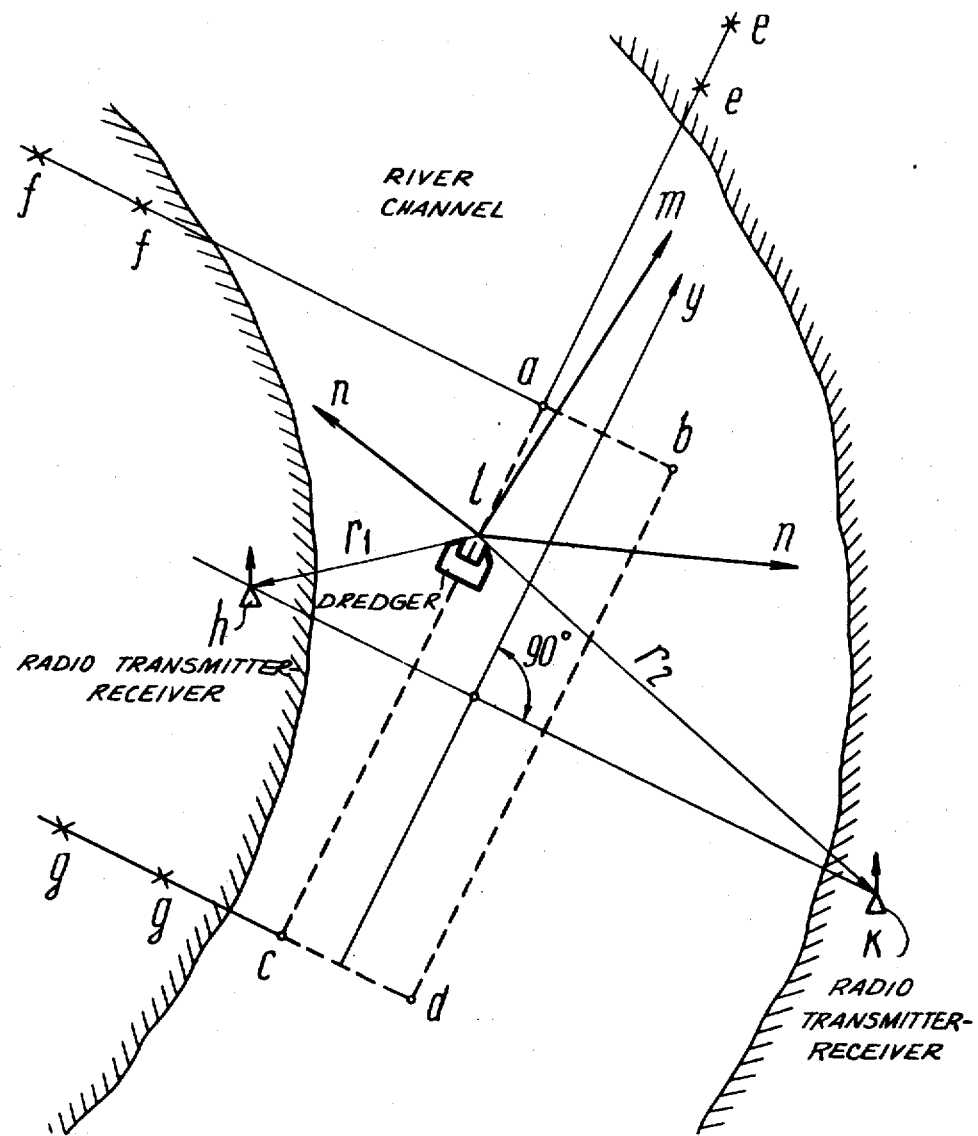
FIG. 1 is a plan view of a portion of the shipping channel being worked by a dredger and it illustrates the operating principles of an apparatus for automatically controlling the movement of the dredger, embodying the invention.

Referring now in particular to the appended drawings, the FIG. 1 shows an exemplary portion of a river, with the points $a, b, c, d$ defining a rectilinear area ("abcd") of the navigating channel, which is to be worked by a dredger. The location of the area "abcd" is defined by the respective pairs of ranges e, f, g.

A pair of radio transmitters-receivers is disposed, respectively, at points h and k disposed on the opposite sides of the area abcd. The dredger is disposed at the point e. The distances from the dredger to the points $h$ and $k$ are equal to $r_1$ and $r_2$, respectively. The line Y in FIG. 1 is the longitudinal axis of the area "abcd" of the navigating channel being operated on; the point $m$ defines the position of the head, or main hauling spud anchor of the dredger, and the points n define the respective positions of the pair of side haulage anchors.

Figure 2:
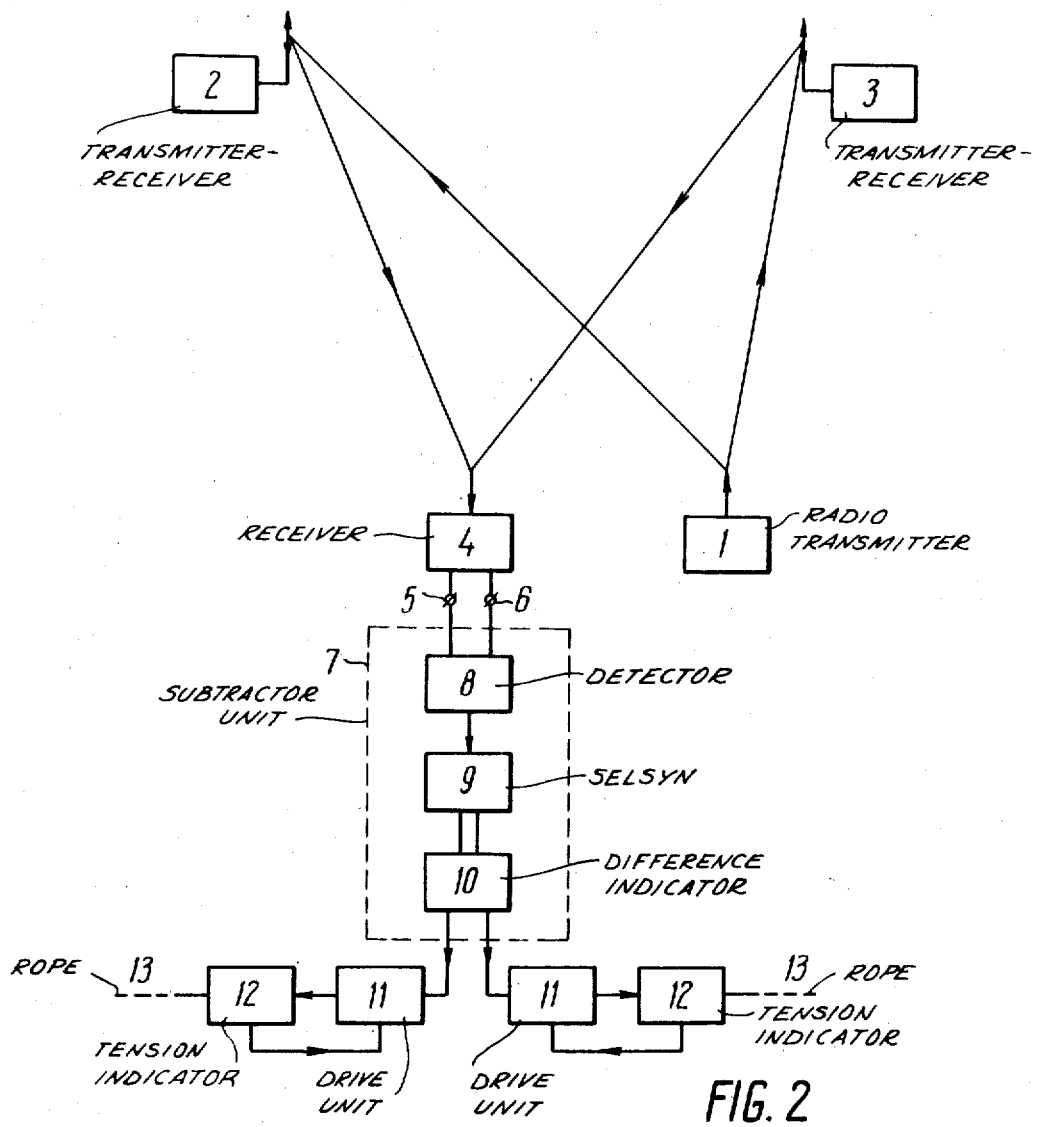
FIG. 2 is a block diagram of an apparatus for automatically controlling the movement of a dredger, embodying the invention.

The apparatus for automatically controlling the movement of the dredger (FIG. 2) comprises a radio transmitter 1 mounted on board the dredger; a pair of transmitter-receiver stations 2 and 3 which are mounted either on land or on water-born objects on both sides of the area of the navigating channel, which is being operated upon, along a line which is perpendicular to the longitudinal axis Y of this area.

Also mounted on board the dredger are a receiver station 4 having two outputs 5 and 6 and a unit 7 adapted to measure the difference between the distances $r_1$ and $r_2$, respectively, from the dredger to the transmitter-receiver stations 2 and 3. The unit 7 includes a detector circuit 8 adapted to measure the difference between the said distances and including a pair of magnetic amplifiers (not shown); the detector circuit 8 being connected to the outputs 5 and 6 of the receiver station 4. The unit 7 further comprises a selsyn 9 connected to the output of the detector circuit 8, and indicator 10 adapted to indicate the difference between the said distances, which is connected with the rotor of the selsyn 9.

The drives 11, respectively, of the starboard and port haulage, or towing winches and the tension indicators 12 adapted to measure the tension, respectively, of the starboard and port haulage ropes 13 are also mounted on board the dredger.

With the rotor of the selsyn 9 set into rotation, the indicator 10 generates control signals which are supplied to the drives 11 of the side haulage winches.

The aerial of the transmitter 1 and of the receiver station 4 is disposed directly above the cutter-suction unit of the dredger.

Figure 3:
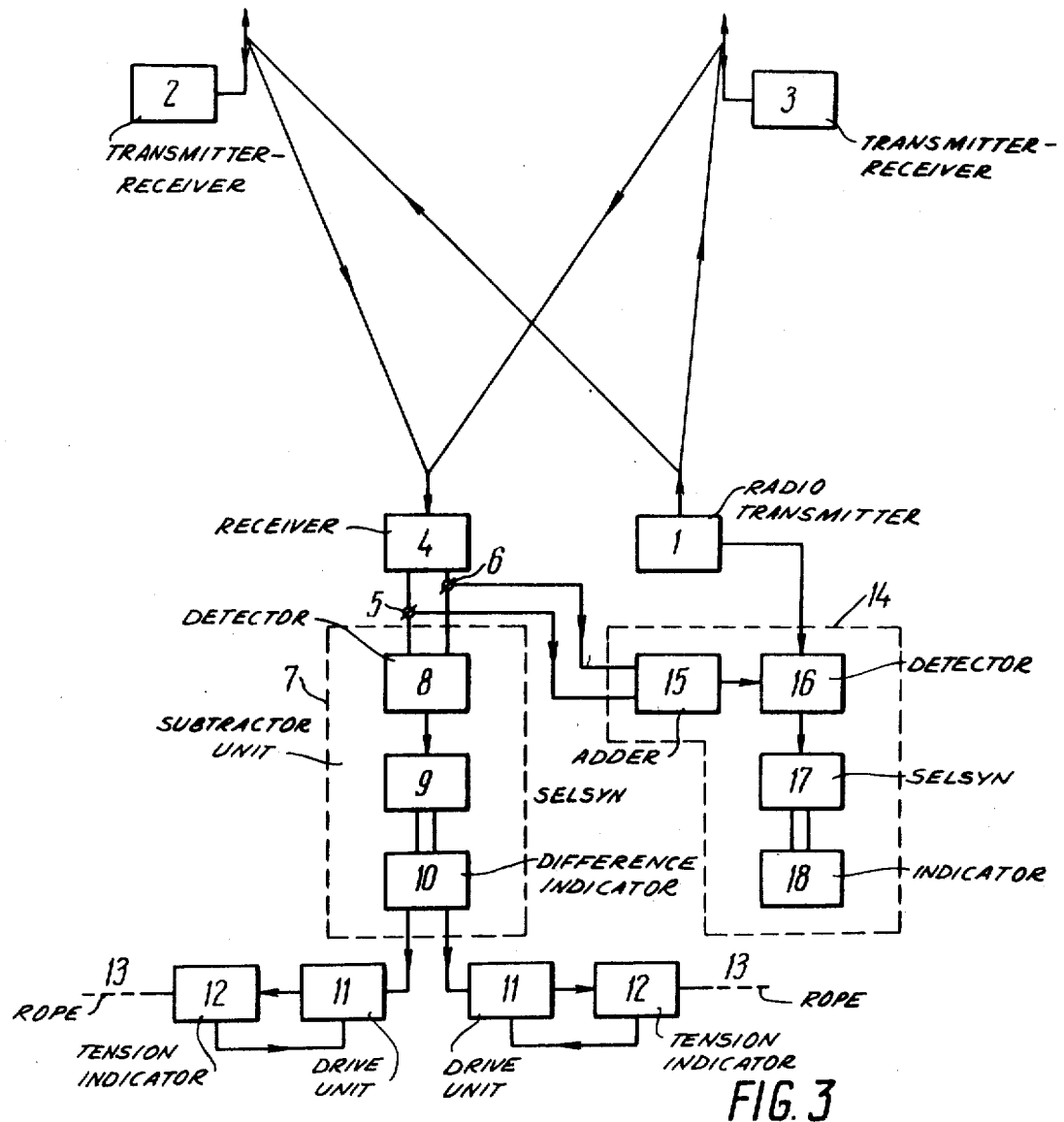
FIG. 3 is the block-diagram of the apparatus, as shown in FIG. 2, additionally including a unit adapted to measure the sum of two distances, in accordance with a feature of the present invention.

Shown in FIG. 3 is a block diagram of the herein disclosed apparatus, additionally comprising a unit 14 adapted to measure the sum of the distances $r_1$ and $r_2$, respectively, between the dredger and the transmitting-receiving stations 2 and 3.

The unit 14 comprises an adder 15 connected to the outputs 5 and 6 of the receiver station 4, a sum-of-the-distances detector circuit 16 connected, respectively, to the outputs of the adder 15 and of the transmitter 1, a sum-of-the-distances selsyn 17 connected to the output of the detector circuit 16 through magnetic amplifiers (not shown) and a calibrated-dial indicator 18 indicating the sum of the distances being measured, connected to the rotor of the selsyn 17.

Figure 4:
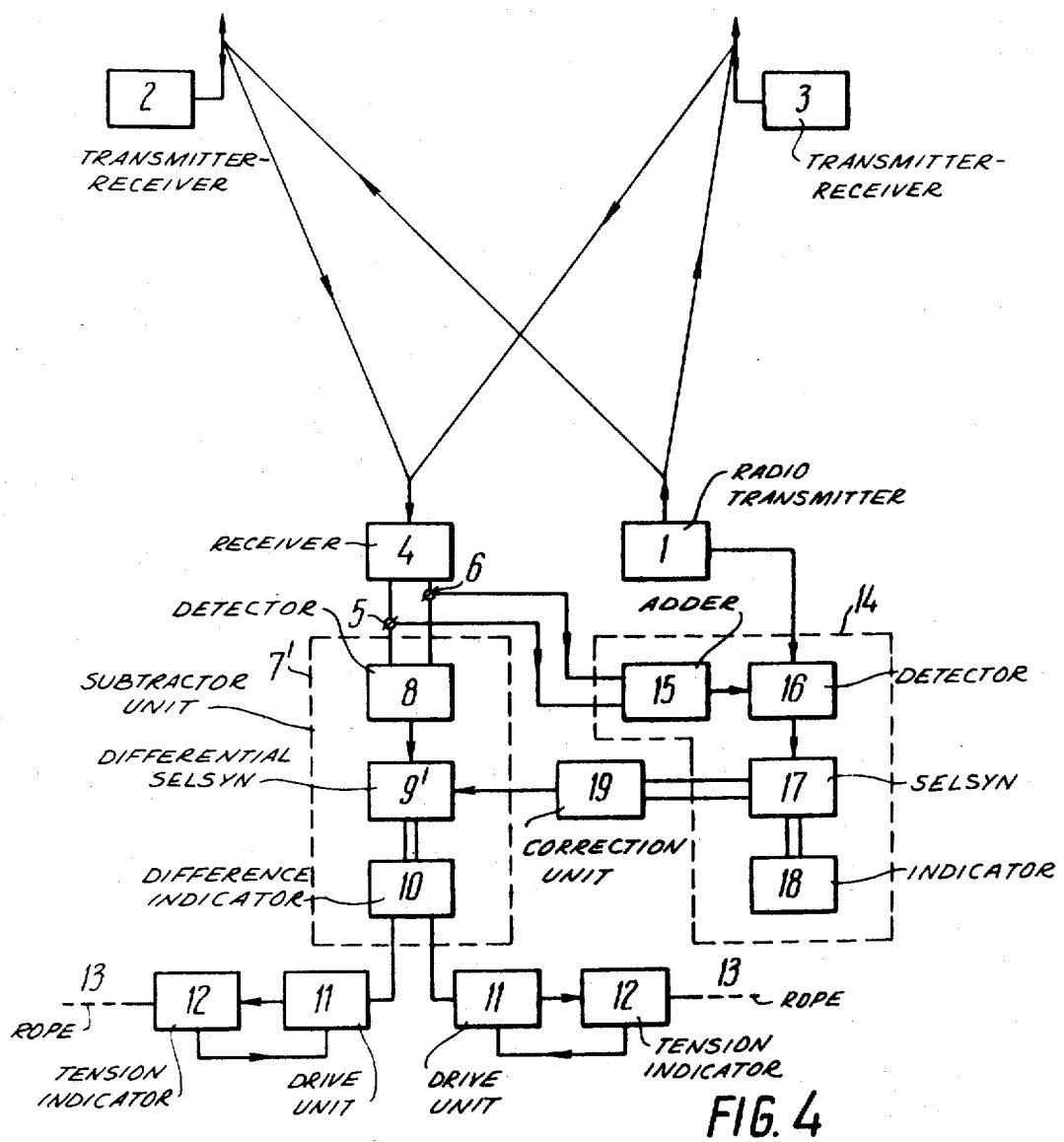
FIG. 4 is the block diagram of the apparatus, as shown in FIG. 3, additionally including a correction unit, in accordance with another feature of the present invention.

Shown in FIG. 4 is a block diagram of the herein disclosed apparatus, additionally comprising a correction unit 19 connected to the output of the unit 14 and to the input of the unit 7', adapted to measure the difference between the distances $r_1$ and $r_2$.

Figure 5:
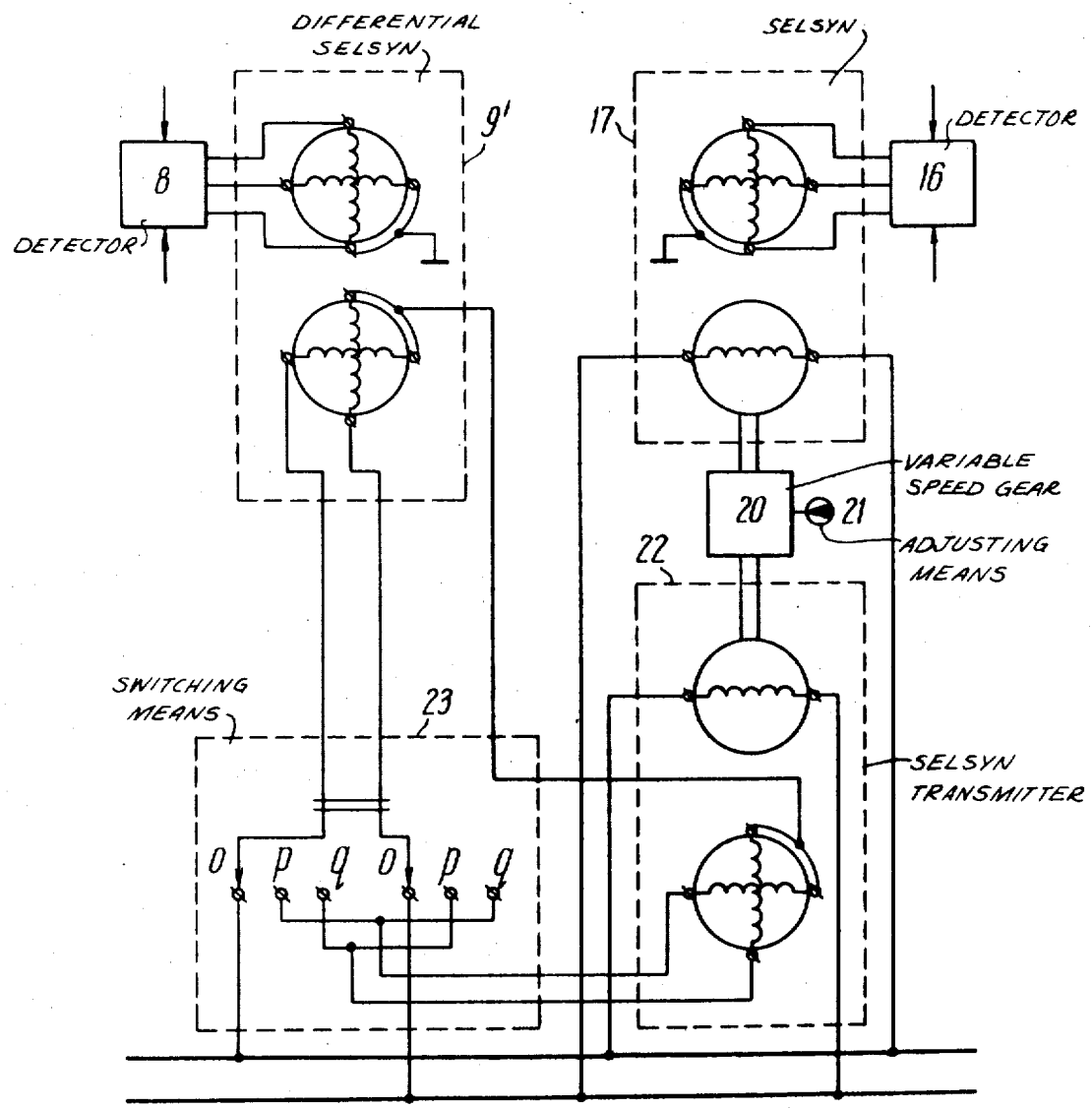
FIG. 5 is a circuit diagram of the correction unit in an apparatus, embodying the present invention.

FIG. 5 illustrates the circuit diagram of the correction unit 19, comprising a differential selsyn 9' of the unit 7', a variable speed gear 20 with an adjusting device 21, a selsyn-transmitter, or a synchro-transmitter 22 and a three-position switch 23, the variable speed reducing gear 20 being of a kind wherein transmission ratio can be infinitely adjusted by the adjustment device 21.

The stator windings of the differential selsyn 9' are connected to the difference-between-the-distances detector circuit 8, whereas the rotor windings thereof are connected through the three-position switch 23 either to the mains supply, when the switch 23 is turned into its O position, or to the stator windings of the synchro-transmitter 22, when the switch 23 is turned either into its p position or into its q position.

The stator windings of the selsyn 17 are connected to the output of the detector circuit 16, while the rotor windings of the selsyn 17 are connected to the supply mains.

The rotor of the selsyn 17 is mechanically connected with the input shaft of the variable speed reducing gear 20 of which the output shaft is mechanically connected to the rotor of the synchro-transmitter 22. The rotor windings of the synchro-transmitter 22 are energized from the mains supply.

The herein disclosed apparatus, embodying the present invention, operates, as follows.

Before commencing the dredging operation, the dredger is positioned by the on-shore ranges e, f, g, at the point l of the area "abcd" (FIG. 1).

Then the main, or head anchor "m" is secured somewhat beyond the leading edge "ab" of the area "abcd", to which one end of the head hauling rope is secured. The other end of the head rope is secured to the drum of the main hauling winch mounted on board the dredger. By the head rope being wound upon the main hauling winch the dredger is driven along the axis of the trench being made.

The side haulage anchors n are put, respectively, on the starboard side and the port side of the area "abcd", and the ends of the side hauling ropes are secured thereto. The other ends of the ropes are secured, respectively, to the drums of the starboard and port hauling winches mounted on board the dredger. By one of the ropes being taken up and the other rope being paid out, the dredger is driven transversely of or swung across the area of the navigating channel, which is being worked.

For automatically controlling the progress of the dredger in a given direction (in the herein described case - axially of the trench being made), a pair of transmitting-receiving radio stations are positioned at the points h and k, respectively, disposed on the opposite lateral sides of the area being operated upon. The distance between the points h and k should be greater than the length of the reference area being operated upon, and the points should lie on a line extending perpendicularly to the longitudinal axis Y of the area "abcd".

Signals sent regularly by the on-board transmitter 1 are received by these two transmitting-receiving stations 2 and 3 positioned, respectively, at the points h and k, and are re-transmitted thereby back to the dredger.

The receiving station 4 (FIG. 2) which is located in the control room of the dredger receives the signals re-transmitted by the stations 2 and 3.

The receiving station 4 has two outputs 5 and 6 to which the signals received from the transmitting-receiving stations 2 and 3 are directed, respectively.

From the outputs 5 and 6 the signals are fed to the input of the unit 7 which measures the difference between the distances $r_1$ and $r_2$.

The unit 7 includes the difference-between-the-distances detector circuit 8 to the input of which the respective signals received by the receiving station 4 are supplied. The output current of the circuit is thus proportional to the different between the distances $r_1$ and $r_2$.

The herein disclosed apparatus automatically controlling the progress of the dredger by maintaining this progress along a path in every point of which the difference between the distances to the points $h$ and $k$ is constant. If the dredger deviates from this path, the difference $r_1 - r_2$ will vary, whereby the rotor of the selsyn 9 will change its angular position, and the indicator 10 will send corresponding control signals to the drives of the side hauling winches 11. The appropriate one of the ropes 13 will be taken up and the other one will be paid out to return the dredger to the predetermined path.

When the difference between the distances becomes again equal to the pre-set constant value, the rotor of the selsyn 9 will return into its initial angular position, and the indicator 10 will send control signals to disengage the side hauling winches.

The rope tension gauges 12 measure and monitor the tension of the side hauling ropes 13.

If the tension of one of the ropes drops below a pre-set value, the respective tension gauge 12 will send a signal to engage the corresponding one of the winches, to tension the rope. In case the tension exceeds the pre-set value, the gauge 12 sends a signal to engage the drive of the respective winch to pay out the rope.

After the dredger has completed the first trench, it is returned back to the starting line, and the reading of the indicator 10, which shows the difference between the distances from the reference points $h$ and $k$, is consulted to shift the dredger laterally to the successive trench which is thereafter worked in a manner similar to that already described.

When the dredger is operated by a side haulage, or swinging method it works the area by traversing it laterally. In this case the indicator 10 is pre-set to generate control signals at the moments when the dredger comes to the starboard and port boundaries of the area, i.e. when the difference $r_1 - r_2$ acquires the corresponding pre-set values.

When the dredger is operated on navigable rivers and channels, it has to be withdrawn from the operating site from time to time, to let other ships pass. After that the dredger has to be returned to the previous position.

In order to define the dredger position by two reference lines, the herein described apparatus may include, in addition to the difference-between-the-distances indicator 10, a unit 14 (FIG. 3) adapted to determine the sum of the distances $r_1$ and $r_2$ from the dredger to the transmitting-receiving stations 2 and 3. The unit 14 comprises an adder 15 having its input, as it has been already stated, connected to the outputs 5 and 6 of the receiving station 4. The output of the adder 15 of the unit 14 is connected to the sum-of-the-distances detector circuit 16 which latter also receives signals from the output of the transmitter 1.

The output current of the detector circuit 16 is proportional to the sum of the distances $r_1$ and $r_2$. After being amplified by the magnetic amplifiers (not shown), this current is fed to the selsyn 17, whereby the angle of rotation of this selsyn is proportional to the sum $r_1 + r_2$.

Before the dredger leaves the operating site to let a ship pass, the indications of the indicators 10 and 18 are registered, and after the ship has passed, the dredger is returned to a point where the indications of these indicators are equal to the registered values.

The hyperbolic reference curve defined by the indications of the difference-between-the-distances indicator 10 and the elliptic reference curve defined by the indications of the sum-of-the-distances indicator 18 intersect at right angles, whereby a high accuracy of determining the position of the dredger is attained.

When the dredger is operated according to the longitudinal trench digging method, and its progress is controlled by the constancy of the difference between the distances from its cutter-suction member to the transmitting-receiving stations 2 and 3, the path of its progress is a straight line, only when the axis of the trench coincides with a line perpendicular to the straight line connecting the points $h$ and $k$ at the middle thereof, i.e., when the difference equals zero. In any other case, i.e., if the dredger is not on the line perpendicular to the middle point of the line "hk," the path of its progress will be a hyperbolic curve.

In order to ensure that the dredger moves along a straight line even when it is not equidistant from the points $h$ and $k$, the herein disclosed apparatus may incorporate a correction unit 19 (FIG. 4).

With the unit 19 operating, rotation of the selsyn 17 of the unit 14 which determines the sum of the distances is transmitted to the differential selsyn 9' of the unit 7' determining the difference between the distances, whereby the measurement of the unit 7' is corrected for the dredger to move along a straight line. The indications of the difference-between-the-distances indicator 10 remain in this case constant even when the dredger is displaced in relation to the line perpendicular to the "hk" at the middle thereof.

The rotor winding of the synchro-transmitter 22 is supplied with an A.C. voltage from the supply mains.

When the switch 23 is turned into its O-position, the rotor windings of the differential selsyn 9' will be supplied with the same A.C. voltage from the mains. In this case the rotor of the selsyn 9' will rotate only if the difference between the distances $(r_1 - r_2)$ varies, which means that no correction is being introduced.

Should the switch 23 be turned into either the position $p$ or into the position $q$, the rotor windings of the selsyn 9' would become connected with the stator windings of the synchro-transmitter 22. Now the rotor of the selsyn 9' rotates both when the value of the $r_1 - r_2$ varies, and when the rotor of the selsyn 17 rotates, i.e., when the sum of the distances $(r_1 + r_2)$ varies.

The value of the additional angle through which the rotor of the selsyn 9' rotates, when the value of the sum of the distances varies, can be infinitely adjusted by adjusting the transmission ratio of the variable speed gear 20.

When the switch 23 is turned into its $p$ position, the direction of the rotation of the rotor of the selsyn 9', following a variation in the value of the sum of the distances, will be the same as that of the rotation of the rotor of the selsyn 17. With the switch 23 turned into its $q$ position, the two directions will be opposite to each other, i.e. the sign of the correction is reversed.

The main advantage of the present invention is the fact that simple means are used for measuring the difference between the two transmitting-receiving stations located at predetermined points on both sides of the navigating channel being dredged (FIG. 1) and that the readings of the indicator which registers this difference between the distances provide continuous control over the position of the dredger. Should the work-performing member of the dredger, viz. the cutter head, leave the axis of the trench being made, the indicator would send control signals to actuate the drives of the side hauling winches, and the dredger would be automatically returned to the axis of the trench.

The elimination in an apparatus, embodying the present invention, of a highly complicated output system, i.e. of the automatically operating course-laying system, considerably increases the reliability of the apparatus.

The units which are used in an apparatus, embodying the present invention, for measuring the difference between and the sum of the distances ensure that the dredger is highly accurately returned into a position it had occupied prior to leaving the navigating channel to let the other ships pass. Practical experience has shown that an error in defining the previous position of the cutter head does not exceed ±1.0 meter.

The correction unit in an apparatus, embodying the present invention, additionally ensures a high precision in moving the dredger along a preset path with the deviations thereof from the longitudinal axis of the trench being dredged not exceeding ±0.5 meter.

Thanks to the high accruacy of the travel of the dredger along the trenches, and also to the precisely determined boundaries of the area being dredged, the efficiency of the dredging operation is increased, and the time of dredging is reduced.

Although the present invention has been described in connection with a preferred embodiment thereof, it is understood that various modifications and changes may take place without departing from the spirit and scope of the invention, as those skilled in the art will readily comprehend.

Such modifications and changes should be considered, as falling within the scope of the invention, as set forth in the appended claims.

What is claimed is:

1. An apparatus for controlling automatically the movement of a dredger along a predetermined path for performing a dredging operation at a navigable area of a waterway, comprising: a pair of receiving-transmitting stations located outside said dredger on both sides of the area of a navigable channel being dredged, on a line perpendicular to the longitudinal axis of said area; a transmitting-receiving station mounted on board said dredger; all said stations being used for determining the position of said dredger; at least a pair of side hauling winches of said dredger; respective drives of said side hauling winches; a unit adapted to measure the difference between the distances from said dredger to said pair of radio receiving-transmitting stations located exteriorly of said dredger; said unit being adapted to measure said difference between the distances being connected to the output of said receiving station mounted on board said dredger and also connected with said respective drives of said side hauling winches of said dredger for controlling the operation thereof.

2. An apparatus, as set forth in claim 1, comprising a second unit adapted to measure the sum of the distances from said dredger to said pair of receiving-transmitting stations located exteriorly of said dredger, said second unit being connected with said transmitting-receiving station mounted on board said dredger; and a dial indicator of said second unit adapted to measure said sum of the distances.

3. An apparatus, as set forth in claim 2, comprising a third unit adapted to effect correction of the operation of said first-mentioned unit and connected to the output of said second unit and to the input of said first-mentioned unit.

4. An apparatus, as set forth in claim 3, wherein said third unit comprises a synchro-transmitter, a variable speed gear operatively connected with the rotor of said synchro-transmitter and with said second unit, and a three-position switch through which the stator windings of said synchro-transmitter can be selectively connected to the input of said first-mentioned unit.

* * * * *